INVENTORS
CARLO OCCHIALINI ET AL

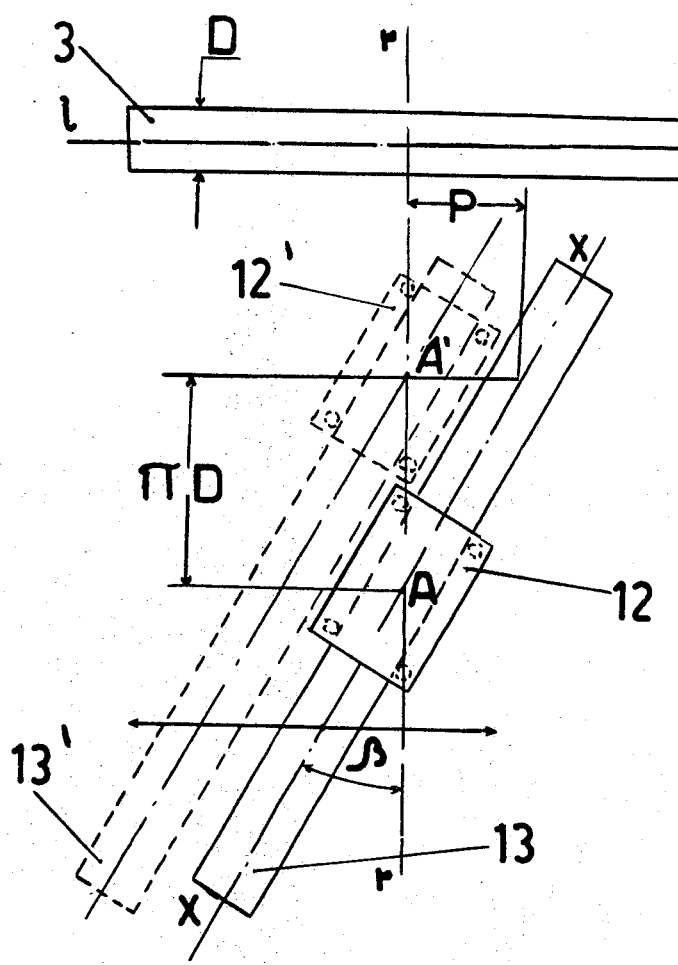
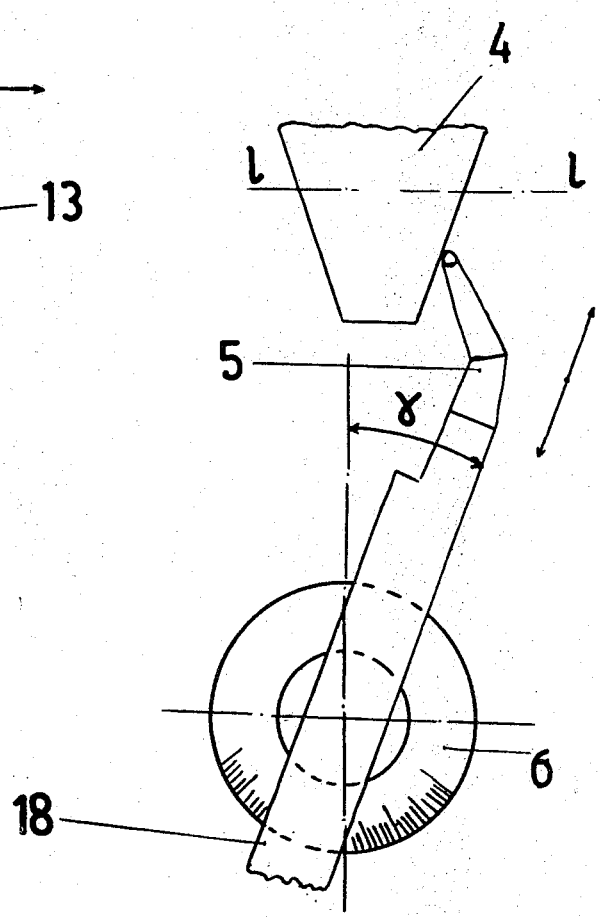
FIG.2.
FIG.3.

United States Patent Office 3,534,481
Patented Oct. 20, 1970

1

3,534,481
MACHINE FOR THE CONTROL OF
HELICOIDS AND INVOLUTES
Carlo Occhialini and Claudio Tattini, Bologna, Italy, assignors to Samputensili S.p.A., Bologna, Italy, a company of Italy
Filed Mar. 25, 1968, Ser. No. 715,599
Claims priority, application Italy, Mar. 28, 1967,
1,588/67; Sept. 4, 1967, 1,759/67
Int. Cl. G01b 5/20
U.S. Cl. 33—179.5     5 Claims

ABSTRACT OF THE DISCLOSURE

Machine for the measure of helicoids and involutes comprising rotatable equipment for mounting a piece to be measured, said equipment controlled by an electric motor with said helicoid; systems of transmission from a spindle controlled by the said motor to a second spindle, at least one belt arranged to carry out alternating movements in translation, there being connected to the said belt a carriage carrying a pivot for a slideblock on which is attached slidingly a bar which controls a carriage, a carriage carrying a measuring member or tracer adapted to engage the helicoid. Preferably said system can take up angles up to 360° determining, by the change of the angle, the corresponding variations in the course of the controlled carriage.

Figure 1:
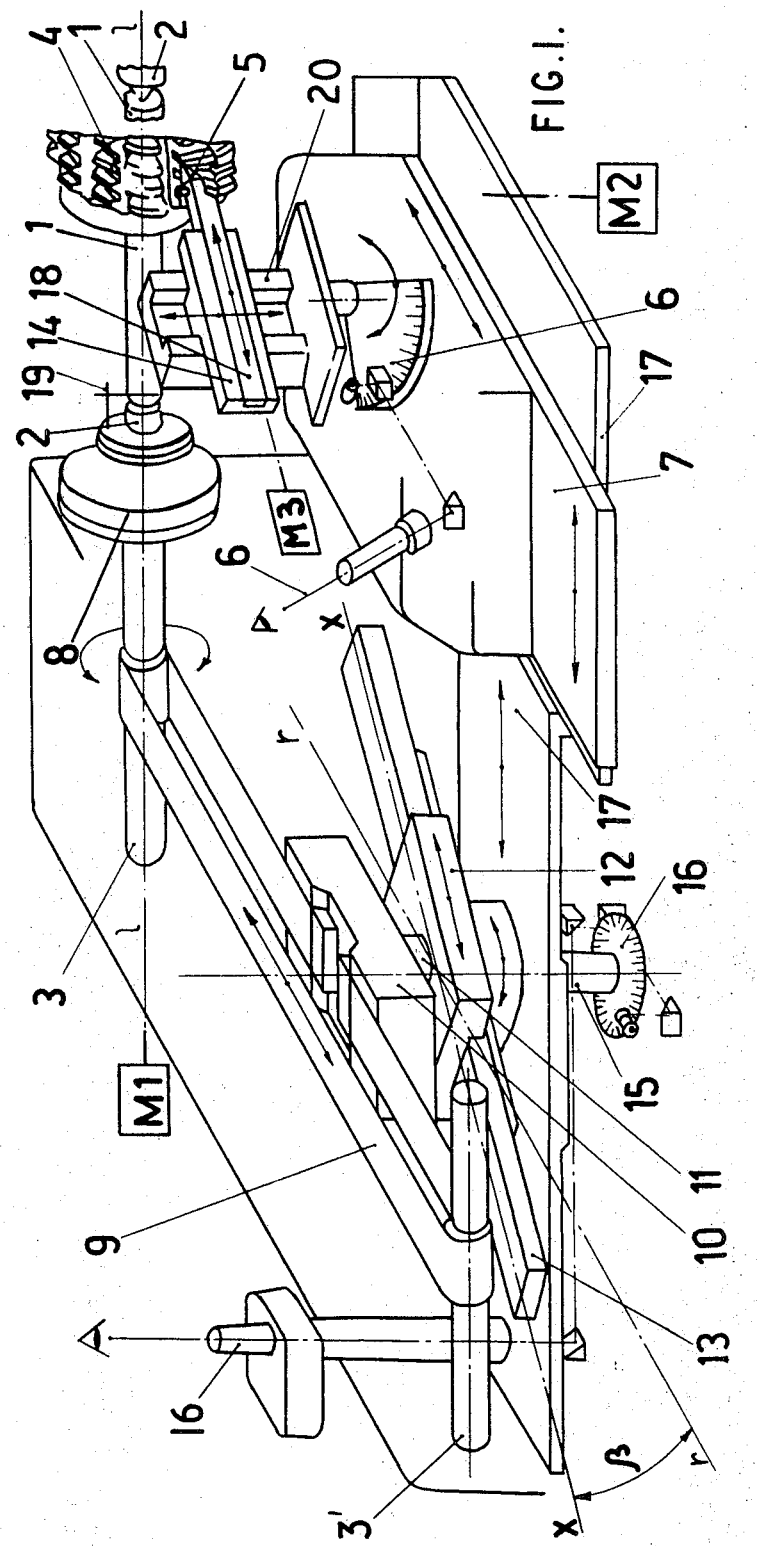

The invention relates to a machine for measuring helicoids and involutes in general, such as gear wheels, screws, design milling cutters, etc.

The importance which, in this branch of precision mechanics, is assumed by controlling such products, both as the finished articles such as gear wheels, endless screws and helicoids in general, as well as the tools which they produce, as in the case of design milling cutters, will be readily recognized. Since this importance is continually increasing, it becomes even more significant to be able to measure and control such items; in the most complete, the most precise and the most rapid way, requisite qualities which often appear to be mutually incompatible, but which must be satisfied at all times, the time for fabricating such products being continually reduced.

It is indispensable that these controls should be able to succeed one another rapidly. To date, with prior art attempts, the results obtained have not been satisfactory.

The aim of the present invention is to provide a machine of the type indicated, comprising an electric motor, a turning arrangement, suitable for supporting the piece to be controlled, systems combined with one or more driving belts, suitable for bringing about alternating translation movements of a carriage carrying a sliding bar which is angularly, regulatable applied to a pivot of a slideblock which supports it; the said angular variation of this bar bringing about variations in the course of a carriage controlling an exploration arrangement or tracer, of the pieces to be controlled.

Another object of this invention occurs when the angular regulation of this bar (which can turn through 360°) exceeds 45° in the which condition the movement of the carriage of the tracer may be controlled by a second motor in another movement action by the same carriage, thus allowing the measure of a helicoid regardless of the size of the step.

A further object hereof is to obtain, by means of a belt arrangement applied to a pair of shafts, control with a single positioning and by the continuity of the movement of the helix and of the step of several spirals of the helicoid.

Another object of this invention is to measure by the application of an appropriate motor, the form of the flank of the tooth of the helicoid or, desiring to control at the same time the form of the flank, the development and the step of the helicoid itself.

Yet another, object thereof is to obtain, by an appropriate position of the feeler tangenttial to the cylinder of a helicoid or involute, the measure of the form of the flank of the helicoid itself, following the rectilinear generatrix and controlling, at the same time, the development and the step of the said helicoid.

A further object of this invention is that the machine may be provided with systems for optical reading, or for registering or electronic systems, suitable for picking up the controls effected by the tracer which is connected to the said systems.

Another object hereof is to provide systems for the measure of helicoids and of involutes, suitable for controlling electrically the rotation of the pieces to be controlled, systems suitable for displacing in the alternating vertical sense, and automatically, a tracer or control instrument for the profiles and the surfaces of the said pieces, picking up the imperfections by a movement which is continuous and synchronized with the other movements of the machine, the movements of raising and lowering of the said tracer being obtained by a driving band or other appropriate arrangement connected to the respective motor.

Further objects and advantages will appear in the description which follows and in the annexed drawings which illustrate exemplary embodiments of the invention, diagrammatically.

Figure 4:
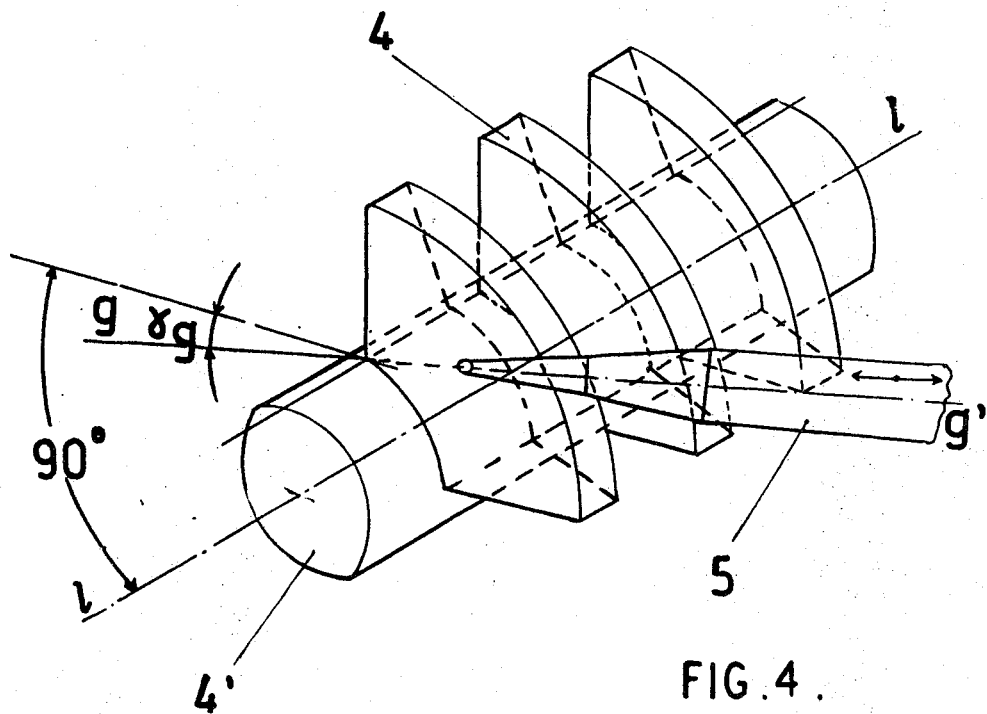
Figure 6:
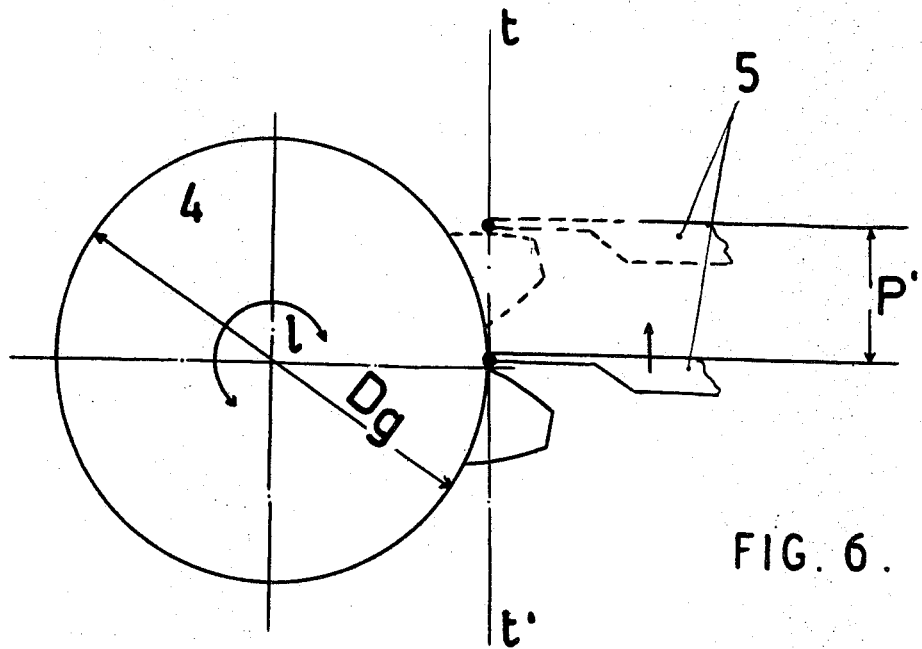
Figure 5:
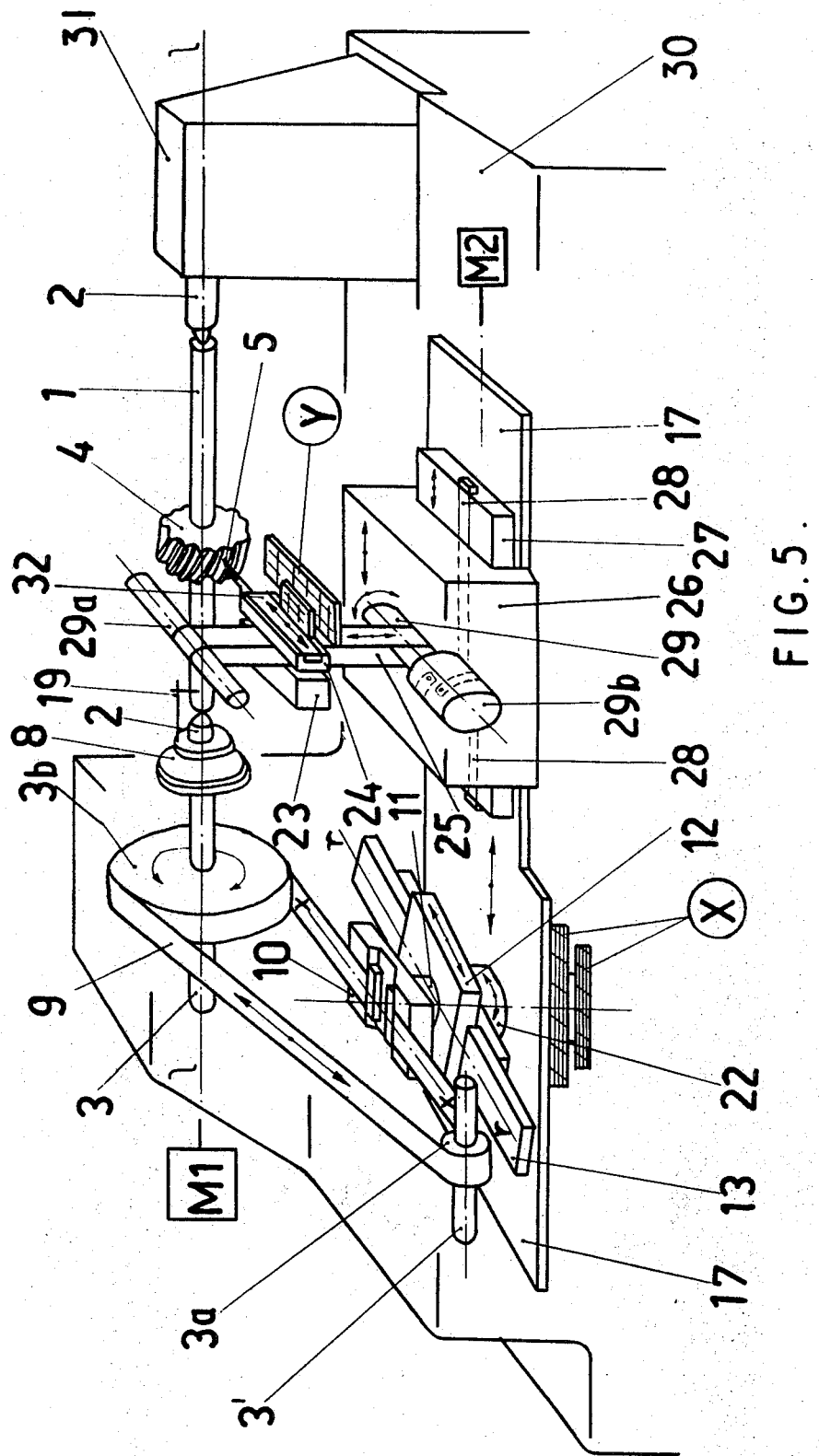

With reference to the said drawings:
FIG. 1 is a general diagrammatic view of the principal parts of one embodiment of an apparatus according to this invention, is a plan view showing a displacement of the bar which regulates the course of the control carriage of the tracer;
FIG. 3 is a fragmentary plan view of the tracer in a working position on a tooth of a helicoid;
FIG. 4 is a perspective view showing the tracer in a tangential position with respect to the basal cylinder of a helicoid or involute;
FIG. 5 illustrates an apparatus similar to the machine shown in FIG. 1 with some variants in the controls of the tracer; and
FIG. 6 shows a detail of the functioning of the tracer in the embodiment of FIG. 5.

In FIG. 1 is seen the spindle 1 carrying the workpiece 4 to be measured, the spindle 1 being mounted between the point and the counter-point 2.

The spindle 3 is driven by an electric motor shown schematically at M1, which, by means of a conventional dog and dog-actuator clutch 19, causes the helicoid 4 to turn. A second spindle 3' is parallel to the spindle 3 and is connected by a belt drive 9 which carries out alternating movements in translation drawing the carriage 10 along the line r—r. This carriage carries the pivot 11 and draws the slide-block 12 along the same direction r—r. This slide-block 12 slidingly supports a bar 13 which is mounted on the carriage 17 drawing it together with the carriage 7 which carries the tracer or feeler 5.

A displacement, by way of example, of the bar 13 to 13′ (broken line) along the line *l—l* is shown in FIG. 2 with the corresponding positions taken up by the slide-block 12 at 12′.

The spindle 3 results, in this way, connected and capable of producing the alternating movements of the carriage which carries the tracer 5, while the same motor turns the piece 4 under control.

Using the optical reading device 16 or any other system of reading, like that, for example, known under the name "inductosin," one now gives to the bar 13 an angle $\beta$.

The movement in translation of the tracer 5 along the direction *l—l* is linked to the movement in rotation of the spindle 3 and of the helicoid 4 by the following formula:

$$\text{tg }\beta = \frac{P}{\pi.D}$$

For each turn of the spindle 3, the carriage 12 move to a distance equal to $\pi.D$ (12′), the rod 13 moves by a quantity equal to $\pi.D$ tg $\beta$; being carried to 13′ (FIG. 2).

Since the displacement $\pi.D.$ tg $\beta$ must be equal to the step to be controlled, P, the rod 13 will be set at an angle $\beta$ so that $$\text{tg }\beta = \frac{P}{\pi.D}$$

When $\beta$ is greater than 45°, motor M1 is automatically disengaged and motor M2 is energized to control the movement of carriage 17.

A motor M3 controls the movement of the tracer 5 along the guide 18. By this movement, placing the tracer 5 in an angular position (FIG. 3) by means of the graduated arrangement 6, and putting M3 in operation, one can measure the form of the flank of the tooth of a helicoid 4. The carriage 14 can, moreover, move vertically on the guide 20 and place the tracer 5 above and below the axis 1—1.

The tracer can, for example, be arranged (FIG. 4) at a tangent to the basal cylinder 4′ of a helicoid or involute and placed with an inclination $\gamma g$ so as to control the form of the flank of the helicoid or involute following the retilinear generatrix *g—g′*.

Furthermore, it is possible, while the step P of a helicoid is controlled, to control the form of the flank, setting in motion the tracer 5 by means of the motor M3 after having suitably arranged the tracer itself at the angle $\gamma$.

In this way one can take up the errors of the steps of the helicoid added to the errors of the form of the flank.

The divider mechanism 8 such as a conventional clutch permits carrying out the rotation of the helicoid 4 keeping the spindle 3 fixed. It is thus possible to measure the position of one thread with respect to another, for example, in a creater of several elements, and the distance, for example, of one tooth with respect to another in a gear wheel.

In FIG. 5 it is seen that on the sledge 26, locked to the carriage 17, is fixed a driving belt which causes the bearings and spindles 29–29a–29b to turn, the latter mounted on the carriage 27. The belt 28, having the extremities rolling on 29b regulates the movements between the sledge 26 and the carriage 27.

The belt 25, which is displaced in a vertically alternate direction perpendicular to the line *l—l*, moves the carriage 24 in which slides the sledge 32 which in its turn carries the tracer 5.

The sledge 32 can be positioned by means of a reading system $\gamma$, in such a way that the point of the tracer is exactly tangential to the basic circle of the involute to be controlled. Thus it is that, while the gear wheel is turning, the tracer 5 is displaced in a straight line tangentially to the basal circle *t–t′* of the involute to be controlled (FIG. 6).

The relation which connects the movement is rotation of the piece 4 with the vertical displacement P′ of the tracer on the straight line tangential to the basal circle *t–t′* is deduced in the following way:

The carriage 17 at each turn in rotation of the piece to be controlled 4, is displaced by a value P or $$P = \pi D \text{ tg } \beta$$

the carriage 17 is displaced by P′ or $$p' = P.K1$$

so it is that:

$$P.K1 = D. \text{ tg } \beta K$$

the displacement P.K for each turn of the piece is equal to $$P.K1 = \pi Dg$$

or $Dg$ = basal diameter of the involute to be controlled.

In conclusion one has:

$$\pi Dg = \pi D \text{ tg } \beta K1$$

from which it results that the placement angle is equal to $$\text{tg }\beta = \frac{\pi Dg}{\pi D.K1} = \frac{Dg}{D.K1}$$

The machine can be fitted with a recording device having large magnifications for taking off the roughness along the tooth.

The present discovery, as illustrated and described in the form of examples, must be understood to extend to accessory modification which, as such, come within the scope.

We claim:

1. Apparatus for the measurement of helicoid and involute workpieces, comprising first motor means for turning a workpiece to be measured; first spindle means rotated by said first motor means; second spindle means; transmission means interconnecting said first and second spindle means for rotating said second spindle means on rotation of said first spindle means by said first motor means; said transmission means including at least one belt arranged to carry out alternating movements in translation; first carriage means connected to said at least one belt for translation thereby; pivot means secured to said first carriage means for translation therewith; slide-block means secured to said pivot means; bar means slidingly carried by said slide-block means; second carriage means secured to said bar means for movement therewith; and tracer means carried by said second carriage means including portions engaging the workpiece.

2. Apparatus as claimed in claim 1 wherein said bar means can be moved through angles of up to 360°; whereby, by changing said angle, corresponding variations in the movement of said second carriage means can be effected.

3. Apparatus as claimed in claim 2 further including a second motor means; when said angle of said rod means exceeds 45°, the movement of said second carriage means being effected by said second motor means which is arranged in a position different from that of said first motor means.

4. Apparatus as claimed in claim 1, wherein said second carriage means include a tracer carriage member carrying said tracer means; tracer driving belt means operatively connected to said tracer carriage member for effecting alternating vertical movements thereof; sledge means slidingly supporting a control carriage member; and a third spindle means mounted on said control carriage member; control belt means operatively connected between said control carriage member and said third spindle means for movement of said control carriage member relative to said sledge means; and said tracer driving belt means being operatively associated with said third spindle means.

5. Apparatus as claimed in claim 1, wherein said tracer means is operatively associated with sensitive systems suitable for effecting the necessary reliefs in a continuous way on the workpiece, these systems being operatively connected to amplifying and/or recording means.

References Cited

UNITED STATES PATENTS

| | | | |
|---|---|---|---|
| 3,388,477 | 6/1968 | Hemmert | 33—179.5 |
| 2,563,000 | 8/1951 | Bean | 33—179.5 |
| 2,108,414 | 2/1938 | Schurr | 33—179.5 |

SAMUEL S. MATTHEWS, Primary Examiner